March 13, 1973   H. GRUNBAUM   3,720,100
APPARATUS FOR THE MEASUREMENT OF TENSILE STRESSES
ON BANDS, FILAMENTS OR THE LIKE
Filed Sept. 3, 1970

United States Patent Office 3,720,100
Patented Mar. 13, 1973

3,720,100
APPARATUS FOR THE MEASUREMENT OF TENSILE STRESSES ON BANDS, FILAMENTS OR THE LIKE
Heinrich Grunbaum, Binningen, Switzerland, assignor to Dr. C. Schachenmann & Co., Basel, Switzerland
Filed Sept. 3, 1970, Ser. No. 69,270
Claims priority, application Switzerland, Sept. 9, 1969, 13,854/69
Int. Cl. G01l 5/04
U.S. Cl. 73—144
10 Claims

ABSTRACT OF THE DISCLOSURE

Testing apparatus for measurement of tensile stresses on elongated flexible band-like or filamentary products has two stationary guide rollers and a movable testing roller which is displaced through short distances in response to changes in tensile stresses upon the product. The product is trained over the rollers whereby the testing roller causes a transducer to produce appropriate signals whenever the testing roller changes its position in response to a change in tensile stress. The operating range of the testing apparatus can be broadened by moving the testing roller sideways independently of the changes in tensile stress to whereby change the extent of overlap between the product and the peripheral surface of the testing roller.

BACKGROUND OF THE INVENTION

The present invention relates to testing apparatus which are utilized to measure tensile stresses acting on flexible products such as strips, bands, cords, ropes, filaments or the like. More particularly, the invention relates to improvements in testing apparatus of the type wherein the product to be tested is trained over and exerts a pressure against a movable testing member which in turn influences a signal generator so that the latter produces signals which are indicative of the tensile stress.

A drawback of many presently known testing apparatus is that they cannot measure tensile stresses within a sufficiently wide range. Thus, if an apparatus if satisfactory for the measurement of stresses which range between 10–20 kp., it cannot be used to measure stresses between 50–125 kp. Certain measuring apparatus are already provided with adjusting means to vary the range of their measurements. This is normally achieved by a rather complicated adjustment of the linkage between the testing member and the signal generator. Such adjustment necessitates disconnection of the signal generator from the testing member, an adjustment of the linkage between the two, and a renewed attachment of the signal generator. The extent to which the product to be tested engages with the testing member remains unchanged. Such procedure consumes much time and hence a lengthy interruption in the operation of the machine which produces or processes the products. Another drawback of conventional testing apparatus is that the adjustment to change or broaden the range of their measurements must be carried out by skilled personnel.

SUMMARY OF THE INVENTION

An object of the invention is to provide a novel and improved testing apparatus which is used for determination of tensile stresses acting on flat, round or otherwise configurated elongated flexible products and which can be rapidly, accurately and repeatedly adjusted to select an appropriate range of measurements.

Another object of the invention is to provide a testing apparatus which is used for determination of tensile stresses acting on products which move lengthwise and whose range can be adjusted without necessitating any interruptions in the transport of products.

A further object of the invention is to provide a single, compact and rugged apparatus which can determine and indicate the magnitude of tensile stresses within a wide range and which can be manipulated by semiskilled persons.

An additional object of the invention is to provide a novel mounting for the testing member of the improved testing apparatus.

The invention is embodied in a testing apparatus for the determination of tensile stresses acting on elongated flexible band-like or filamentary products. The apparatus comprises a pair of first guide members, a movable guide member having a circular peripheral outline whereby the product to be tested is trained over the guide members so that it overlies a portion of each guide member and exerts on the movable guide member a force which is proportional to the tensile stress and to the length of that portion of the product which overlaps the movable guide member, and displacing means for moving the movable guide member sideways with reference to the first guide members between a plurality of positions in each of which the periphery of the movable guide member is engaged by a product portion of different length. Such adjustment of the movable guide member serves to change the operating range of the testing apparatus.

The movable guide member is movable by a carrier which forms part of the displacing means, and the movable guide member is further movable with reference to the carrier through small distances in response to changes in the tensile stress upon the product. Such minimal displacements of the movable guide member with reference to the carrier are detected by a suitable transducer (e.g., a differential transformer) which produces signals for transmission to a voltmeter or another suitable gauge to permit visual observation or recordal of measured tensile stresses.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
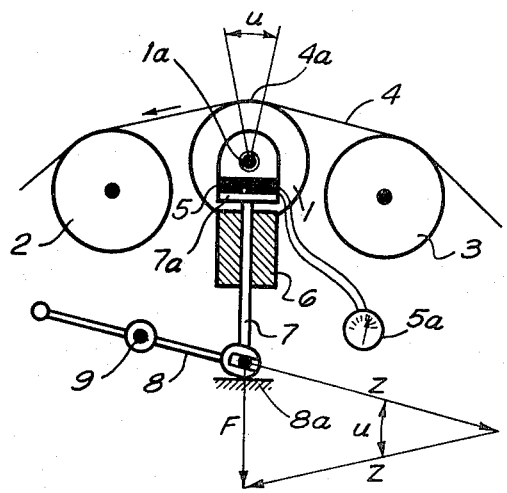
FIG. 1 is a schematic partly side elevational and partly sectional view of a first testing apparatus wherein the carrier for the testing member is held in a first position.
Figure 2:
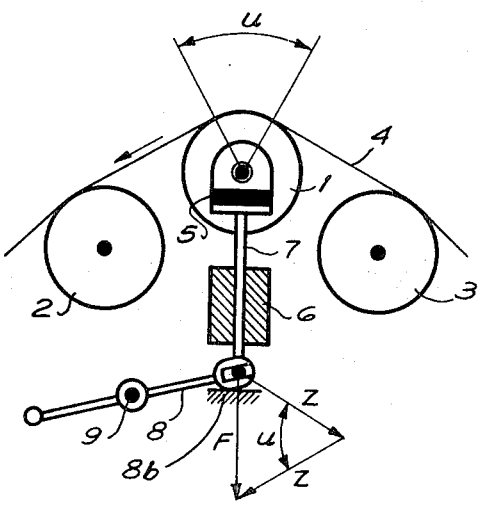
FIG. 2 illustrates the structure of FIG. 1 but with the testing member in a second position.

FIGS. 1 and 2 illustrate a testing apparatus which is used to determine tensile stresses acting on a flexible product 4 which may constitute a band, strip, filament, cord, rope or the like. The apparatus comprises a pair of stationary guide members 2, 3 here shown as rollers which flank a movable guide member or testing member 1 mounted for rotation about the axis of a shaft which is mounted in a bearing member or bracket 1b. The product 4 is trained over the rollers 1–3 so that it overlaps or overlies a portion of the peripheral surface of each roller. The angle u indicates the extent of overlap (i.e., the length of contact) between the product 4 and the peripheral surface of the testing roller 1. The bracket 1b exerts a pressure against a signal generator 5 which produces signals indicating the magnitude of tensile stress on the travelling product 4. The signal generator 5 is mounted on the platform 7a of a reciprocable carrier or rod 7 which is guided in a stationary bearing sleeve 6 and forms part of a displacing mechanism for the testing member 1. This displacing mechanism further includes a two-armed lever 8 which is fulcrumed at 9 and can maintain the rod 7 in several predetermined axial positions including those shown in FIGS. 1 and 2. The magnitude of the angle u, and hence the operating range of the testing apparatus, varies in response to axial displacement of the rod 7. The displacing means further comprises stops or abutments 8a, 8b which hold the rod 7 against any downward axial movement in the respective position. Thus, when the stop 8a engages the rod 7 and/or the lever 8 in the position shown in FIG. 1, the platform 7a cannot move away from the path for the product 4 so that changes in the pressure applied by the portion 4a of the product 4 upon the peripheral surface of the testing roller 1 will affect the generation of appropriate signals which are transmitted to a suitable gauge 5a for visual indication of recorded of the measured tensile stress.

The exact construction of the signal generator 5 and gauge 5a forms no part of the present invention. For example, the signal generator may be an electrical differential transformer which can produce readily detectable output signals in response to displacement of the bearing member 1b with reference to the platform 7 through distances as small as 0.2–0.5 mm. or even less. The transformer can be coupled to an elastic element whose characteristic insures a linear relationship between the value of the emitted electrical signal and the applied mechanical force. Thus, such a transformer can be said to constitute a transducer which can convert the applied force into an infinite number of proportional electrical signals within any practical range of forces supplied by the testing roller 1.

The testing apparatus of the present invention can utilize with equal advantage several other types of signal generators, for example a capacitative or photoelectric transducer or a pressure-responsive transistor. Still further, the apparatus can utilize signal generators in the form of hydraulic pressure gauges or the like.

The lever 8 can be pivoted by hand or by remote control to move the rod 7 between the positions shown in FIGS. 1 and 2 and, if necessary, to one or more additional axial positions. Each such position corresponds to a different angle u. The tensional stress on the product 4 is shown at Z and the pressure acting on the signal generator 5 are indicated at F. The relationship between the tensional stress and the pressure upon the signal generator can be expressed by the equation $$F = 2Z \sin \frac{u}{2}$$

Thus, if the product 4 is in mere print contact with the testing roller 1 (i.e., when $u=0$), the pressure F also equals zero. The pressure F reaches a maximum value when u equals 180 degrees ($F=2Z$).

The present invention was made after the discovery that, in actual use of a testing apparatus, there arise situations when the tensile stresses vary within a range which exceeds the capabilities of the signal generator in a conventional testing apparatus. If the range of a signal generator is 1:5, it being assumed that the accuracy of the signal generator remains within an acceptable tolerance range, such a signal generator should be capable of being used in testing apparatus which measure tensile stresses of 5–100 kp., i.e., within a range of 1:20. For example, the signal generator may be of the type which produces signals with requisite accuracy when the force F varies between 5–10 kp. When the force F equals for example 15 kp., the signal generator produces a signal which indicates a force of 10 kp. The object of the present invention is to provide a testing apparatus wherein such a signal generator can be used to accurately indicate tensile stresses which produce forces for exceeding the maximum force that can be accurately indicated by the employed signal generator.

It was found that, in certain instances, the range of the improved testing apparatus can be broadened sufficiently if the rod 7 is movable between two axial positions, for example, between a first position where the angle u equals 11.5 degrees and a second position in which the angle u is 60 degrees. In the first position, $F=0.2Z$, and in the second position, $F=Z$. In the first position, the apparatus can measure tensile stresses between 25–125 kp., and in the second position tensile stresses between 5–25 kp. Thus, the testing apparatus can measure tensile stresses of a minimum magnitude (5 kp.) and a maximum magnitude which equals 25 times the minimum magnitude. At the same time, the signal generator merely covers the permissible range of 1:5.

On the other hand, it is often desirable to effect an adjustment in the position of the rod 7 and signal generator 5 between positions which are selected in such a way that the respective operating ranges overlap each other. For example, the rod 7 can be moved between three positions in which the apparatus respectively measures stresses of 20–100, 10–50 and 5–25 kp. Thus, each next-following position halves the value of tensile stresses in the preceding position. This can be achieved by selecting the angles u for the three positions of the rod 7 in such a way that the value of $$\sin \frac{u}{2}$$

for each next-following position is twice the value of $$\sin \frac{u}{2}$$

for the preceding position. Though the manner of selecting the various positions is basically immaterial, it is of substantial practical advantage to select the positions in such a way that the values of $$r = \sin \frac{u}{2}$$

for successive positions from a divergent geometric progression $a, ar, ar^2 \ldots$ wherein r is a whole number. This is due to the fact that the gauge 5a need not be provided with several sets of dials, i.e., with a separate dial for each position of the rod 7. The gauge 5a may be a voltmeter whose dial carries graduations indicating tensile stresses in the range of 10–50 kp. The graduations are directly indicative of the measured tensile stresses in the second position of the rod 7. When the rod is moved to the first position (range of 20–100 kp.), the value indicated by the graduation which is pinpointed by the needle of the voltmeter 5a must be multiplied by two. The value of the pinpointed graduation must be divided by two when the rod 7 is moved to the third position (range of 5-25 kp.).

As mentioned above, conventional testing apparatus can be adjusted to change the range of measurements by disconnecting the gauge from the linkage which connects it to the signal generator, by thereupon changing the transmission ratio of the linkage, and by reattaching the gauge to such linkage. This necessitates lengthy interruptions in the operation of the machine which produces and/or processes the flexible product. In the testing apparatus of the present invention, the operation of the machine need not be interrupted at all because the angular position of the lever 8 can be changed while the product 4 continues to run lengthwise.

Figure 3:
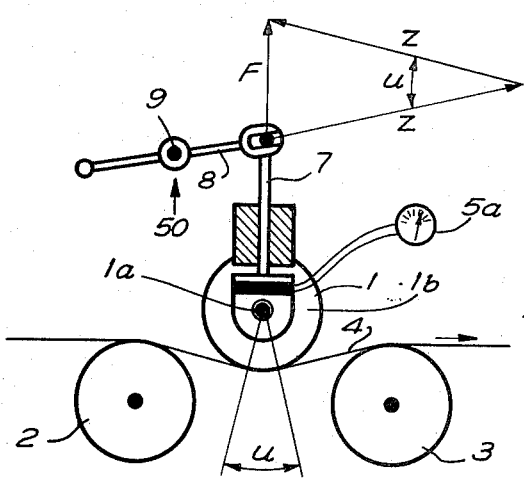
FIG. 3 is a schematic partly side elevational and partly sectional view of a second apparatus, with the carrier for the testing member in a first position.
Figure 4:
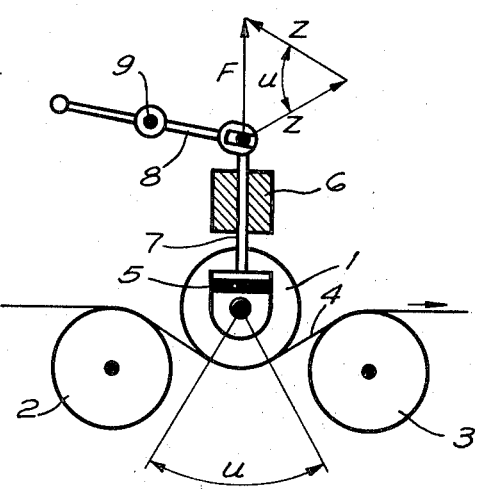
FIG. 4 illustrates the structure of FIG. 3 but with the carrier in a second position.

FIGS. 3 and 4 illustrate a second testing apparatus which differs from the apparatus of FIGS. 1 and 2 in that the movable guide member or testing roller 1 is located at one side of the path for the product 4 and that the stationary guide rollers 2, 3 are located at the other side of the path. Such mounting of the rollers 1-3 can present problems in connection with initial treading of the product 4 through the testing apparatus. Therefore, the lever 8 is preferably mounted in such a way that it can move the rod 7 to at least two positions (such as those shown in FIGS. 3 and 4) and a further or retracted position in which the testing roller 1 is moved upwardly and away from a common tangent for the guide rollers 2, 3 so that the leading end of the product 4 can be readily introduced by hand. For example, when the lever 8 assumes the angular position of FIG. 3, it can be moved sideways (as indicated by the arrow 50) to move the roller 1 upwardly and beyond the position of FIG. 3 so that the threading of the product can be readily performed by hand. The retracted position of the testing roller 1 is preferably such that the workman can thread the product by advancing it along a straight path between the uppermost points of the guide rollers 2, 3 and the lowermost point of the testing roller 1. It is clear that the apparatus of FIGS. 1-2 or 3-4 can be used in inverted position so that all of the rollers are located below the path of the product 4 (inversion of the apparatus shown in FIGS. 1-2) or that the axis of the testing roller is located below the axes of the guide rollers 2, 3 (inversion of the apparatus shown in FIGS. 3-4). Furthermore, the axes of the rollers 1-3 need not be located in horizontal planes. It is further clear that the rod 7 can be replaced with an eccentric, a lever or another carrier which is movable along an arcuate path rather than along a straight path, as long as the rod or an analogous carrier can move the testing roller in directions at right angles to its axis and transversely of the path for the product 4. It is also clear that the testing apparatus need not employ a single testing roller and that the testing roller need not be flanked by the other two rollers. For example, the roller 2 or 3 can be moved by the rod 7 or an analogous carrier while the roller 3 or 2 and the roller 1 rotate about fixed axes. Finally, the signal generator 5 need not share the movements of the carrier for the testing roller, as long as the intensity or another characteristic of its signals varies proportionally with changes in the angle $u$.

Certain presently known testing apparatus are already provided with a testing roller which is movable to change the magnitude of the angle of overlap between the peripheral surface of such testing roller and the tested product. However, such adjustments in the extent of overlap between the product and the testing roller are not utilized to change the range of measurements of the testing apparatus but rather to produce counteracting or reaction forces whose magnitude is not proportional to that of tensile stresses. In fact, the magnitude of such reaction forces often remains unchanged. On the other hand, the improved testing apparatus, wherein the distances covered by the testing roller 1 in response to changes in tensile stresses in the product 4 are extremely small, can maintain the ratio between the reaction forces and the tensile stresses at a constant value so that the changes in the angle $u$ can be used exclusively to change the operating range of the testing apparatus.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a testing apparatus for the determination of tensile stresses in elongated flexible band-like or filamentary products, a combination comprising a first pair of guide members; a movable guide member having a circular peripheral outline, the product to be tested being trained over said guide members so that it overlies a portion of each guide member whereby the product exerts on said movable guide member a force which is proportional to the tensile stress and to the length of the portion of the product which overlaps said movable guide member, said movable guide member being movable to an arrestable in a plurality of predetermined positions wherein the sine values of the halves of angles along which the product overlaps said movable guide member in said predetermined positions of said movable guide member form a geometric progression of whole numbers; signal generating means connected to said movable guide member for movement therewith for generating signals indicating said force without practically changing the relative position of said movable guide member and said signal generating means; and displacing means for moving said movable guide member between at least two of said predetermined positions and for arresting the same in each of said positions to thereby change the metering range of said testing apparatus.

2. A combination as defined in claim 1, wherein said first guide members are rollers and said movable guide member is also a roller which is movable by said displacing means at right angles to its axis.

3. A combination as defined in claim 2, wherein said guide members define for the product a path and wherein such path is flanked by two of said members on one side and by the third member on the other side thereof, said third guide member constituting said movable guide member and being movable by said displacing means to a retracted position in which the product can be manually advanced along said path.

4. A combination as defined in claim 2, wherein said movable guide member is flanked by said first guide members.

5. A combination as defined in claim 1, wherein said displacing means comprises a reciprocable carrier for said movable guide member and stop means for locating said carrier in each position of said movable guide member.

6. A combination as defined in claim 1, wherein said displacing means comprises a carrier for said movable guide member, said carrier being turnable about a predetermined axis to move said movable guide member between said positions.

7. A combination as defined in claim 1, and including indicating means connected to said signal generating means for visually indicating the force acting on said movable guide member in correspondence with the signals produced by said signal indicating means, the measuring range of said indicating means being changed in each of said predetermined positions of said movable guide member.

8. A combination as defined in claim 1, wherein said displacing means comprises a carrier for said movable guide member, said movable guide member being displaceable through a minute distance with reference to said carrier in response to changes in tensile stress on the product, and further comprising signal generating means for producing in response to displacement of said movable guide member with reference to said carrier signals whose magnitude is indicative of the tensile stress on the product.

9. A combination as defined in claim 8, wherein said signal generating means is mounted on said carrier.

10. A combination as defined in claim 1, wherein said movable guide member is movable between such positions that the operating ranges of said apparatus overlap each other in successive positions of said movable guide member.

References Cited

UNITED STATES PATENTS

| 3,310,981 | 3/1967 | Nixon et al. | 73—144 |
| 1,987,815 | 1/1935 | Bartol | 73—144 |
| 2,528,883 | 11/1950 | Hayward | 73—144 |
| 1,833,195 | 11/1931 | Albright | 73—144 |
| 1,722,036 | 7/1929 | Byl | 73—144 |

FOREIGN PATENTS

| 803,811 | 11/1958 | Great Britain | 73—144 |
| 891,232 | 3/1962 | Great Britain | 73—144 |

RICHARD C. QUEISSER, Primary Examiner

H. GOLDSTEIN, Assistant Examiner